(12) United States Patent
Wu

(10) Patent No.: US 7,861,739 B2
(45) Date of Patent: Jan. 4, 2011

(54) HYDRAULIC PRESSURE DAMPING DEVICE

(75) Inventor: Faucet Wu, Shenang Township, Changhua County (TW)

(73) Assignee: Long Tai Copper Co., Ltd., Changhua County (TW)

( * ) Notice: Subject to any disclaimer, the term of this patent is extended or adjusted under 35 U.S.C. 154(b) by 356 days.

(21) Appl. No.: 12/036,726

(22) Filed: Feb. 25, 2008

(65) Prior Publication Data
US 2009/0211651 A1 Aug. 27, 2009

(51) Int. Cl.
*F04F 1/00* (2006.01)
(52) U.S. Cl. ............ 137/207; 251/149.5; 251/274
(58) Field of Classification Search ............ 251/149.5, 251/152, 215, 264, 274, 903; 137/207; 138/26
See application file for complete search history.

(56) References Cited

U.S. PATENT DOCUMENTS

| | | | | |
|---|---|---|---|---|
| 110,292 | A * | 12/1870 | Scrannage et al. ............ | 251/274 |
| 207,961 | A * | 9/1878 | Gillin ............ | 137/207 |
| 1,865,486 | A * | 7/1932 | Seymour et al. ............ | 137/207 |
| 3,085,590 | A * | 4/1963 | McIlhenny ............ | 137/501 |
| 3,343,560 | A * | 9/1967 | Nankivell ............ | 137/207 |
| 3,603,344 | A * | 9/1971 | Stampfli ............ | 137/513.3 |
| 3,868,972 | A * | 3/1975 | Zirps ............ | 138/30 |
| 4,497,333 | A * | 2/1985 | Rodieck ............ | 137/122 |
| 4,635,751 | A * | 1/1987 | Howell ............ | 181/234 |
| 2007/0289641 | A1* | 12/2007 | Knapp ............ | 137/511 |
| 2008/0128028 | A1* | 6/2008 | Weltman ............ | 137/118.05 |

\* cited by examiner

*Primary Examiner*—John Rivell
*Assistant Examiner*—Craig Price
(74) *Attorney, Agent, or Firm*—Ming Chow; Sinorica, LLC

(57) ABSTRACT

A hydraulic pressure damping device mainly comprises a valve body of which a joint port is provided with a control valve of which one end is provided with a first joint to valve a switch of the valve body between a water inlet and a water outlet. A second joint at the other end of control valve is conjoint with a hydraulic pressure damper to damp the hydraulic pressure. Thus, it is easy to assemble and replace the hydraulic pressure damping device, and materials and installation space may be saved.

4 Claims, 5 Drawing Sheets

HYDRAULIC PRESSURE DAMPING DEVICE

BACKGROUND OF THE INVENTION

1. Field of the Invention

This invention relates to a damping device and particularly to a hydraulic pressure damping device that may directly joint a valve body.

2. Description of Related Art

With reference to FIG. 1, a conventional hydraulic pressure damping device mainly comprises a valve body 1. A switch 2 is provided at an end of the valve body 1, while a joint port 3 is provided at the other end. The joint port 3 joints an end of connecting tube 4 of which the other end joints a T-shaped hydraulic pressure damper 5. The other end of hydraulic pressure damper 5 joints a water inlet tube 6. A water outlet 7 that upwards protrudes is provided between the switch 2 of valve body 1 and the joint port 3, and the hydraulic pressure damper 5 is used to damp the hydraulic pressure and reduce the water hammer action. Although the conventional hydraulic pressure damper 5 may damp the hydraulic pressure, the hydraulic pressure damper 5 must be assembled with the valve body 1 and the water inlet tube 6, and the valve body 1 must additionally joint the switch 2; thus, multiple members are provided at the time of assembly. If the hydraulic pressure damper 5 may join together with the valve body 1, employed materials and steps of installation and replacement may be reduced.

Consequently, because of the technical defects of described above, the applicant keeps on carving unflaggingly through wholehearted experience and research to develop the present invention, which can effectively improve the defects described above.

SUMMARY OF THE INVENTION

A hydraulic pressure damping device comprises a valve body provided with a water inlet conjoint with a water outlet of pipeline, and the other end is separately provided with a joint port conjoint with the water inlet, a water outlet is open formed on the joint port, and one end of a control valve is provided with a first joint and the other end is provided with a second joint. A waterway is axially provided passing through the first joint and the second joint, in which the first joint is conjoint with the joint port to valve the switch between the water inlet and the water outlet. A hydraulic pressure damper is fixed onto the second joint and communicates with the water inlet through the waterway.

In the hydraulic pressure damping device according to this invention, the valve body is directly provided with the hydraulic pressure controller so that the hydraulic pressure controller may be easily installed or replaced and its materials may be reduced.

DETAILED DESCRIPTION OF THE PREFERRED EMBODIMENTS

Now, the present invention will be described more specifically with reference to the following embodiments. It is to be noted that the following descriptions of preferred embodiments of this invention are presented herein for purpose of illustration and description only; it is not intended to be exhaustive or to be limited to the precise form disclosed.

Figure 1:
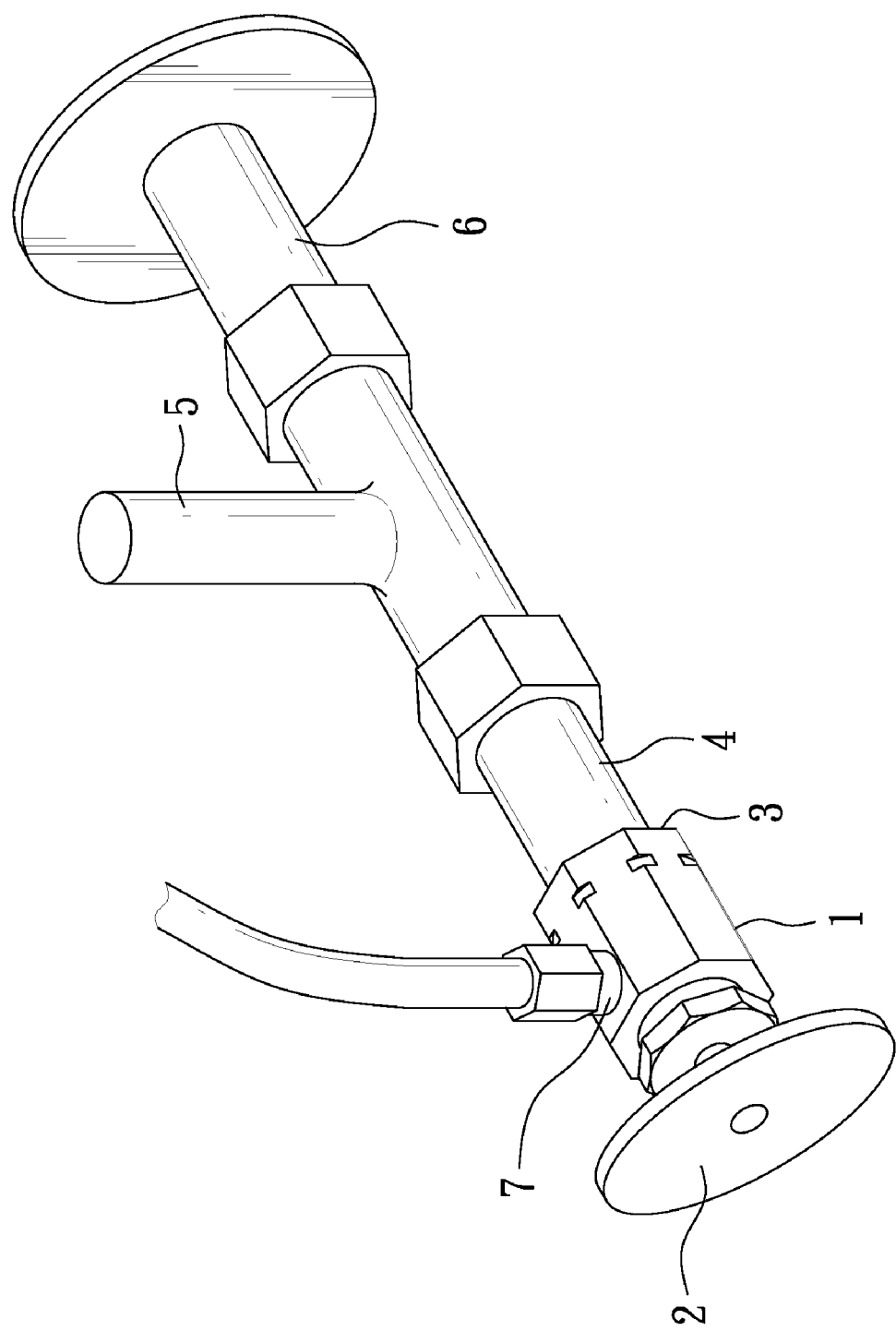
FIG. 1 is a view of the appearance of a conventional hydraulic pressure damping device.
Figure 2:
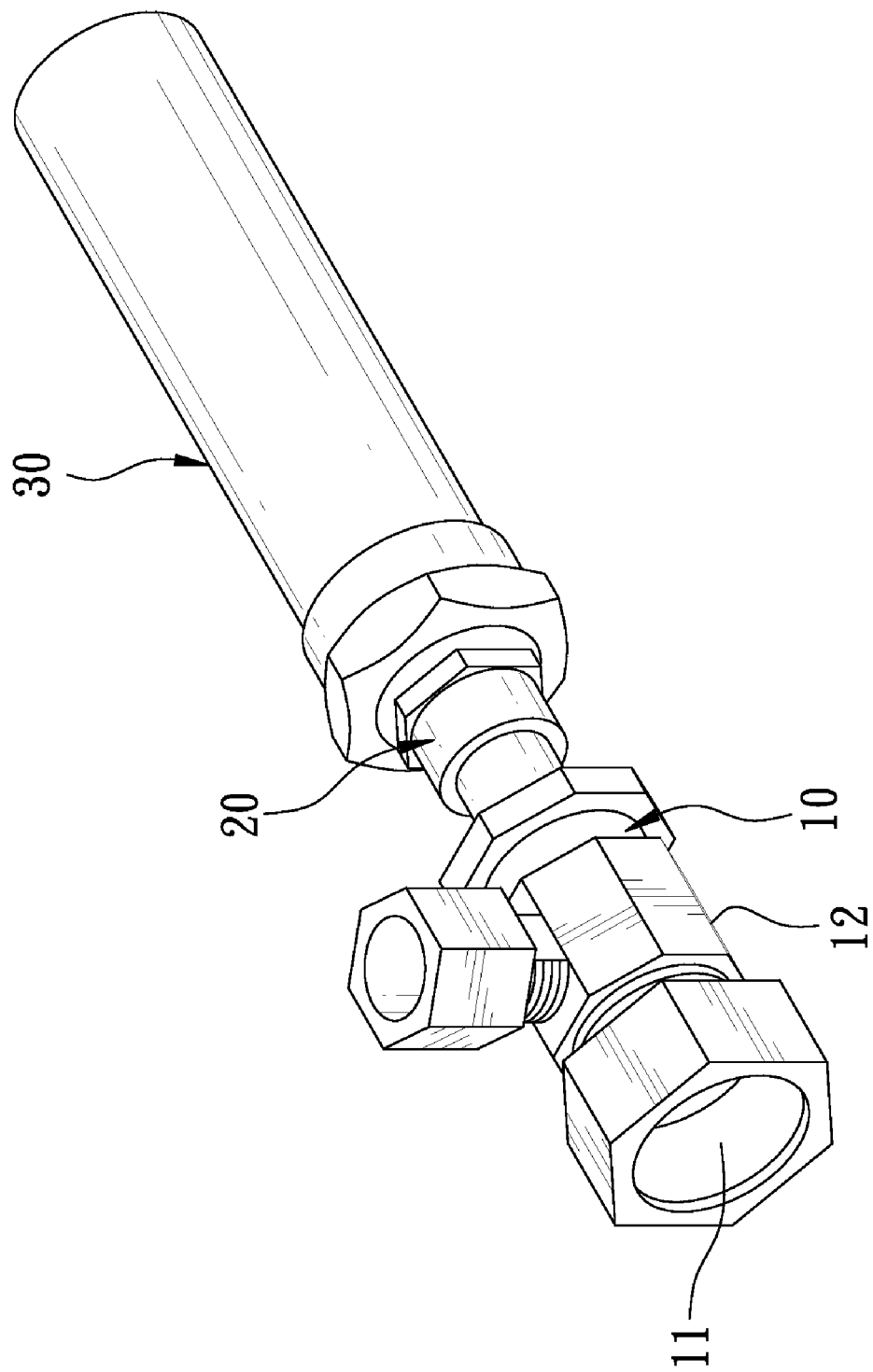
FIG. 2 is a view of the appearance of a preferred embodiment of this invention.

Refer to FIG. 2 as a view of the appearance of a hydraulic pressure damping device according to this invention that may be provided at the water outlet (not shown) of a waterway. The hydraulic pressure damping device mainly comprises a valve body 10, a control valve 20, and a hydraulic pressure damper 30.

Figure 3:
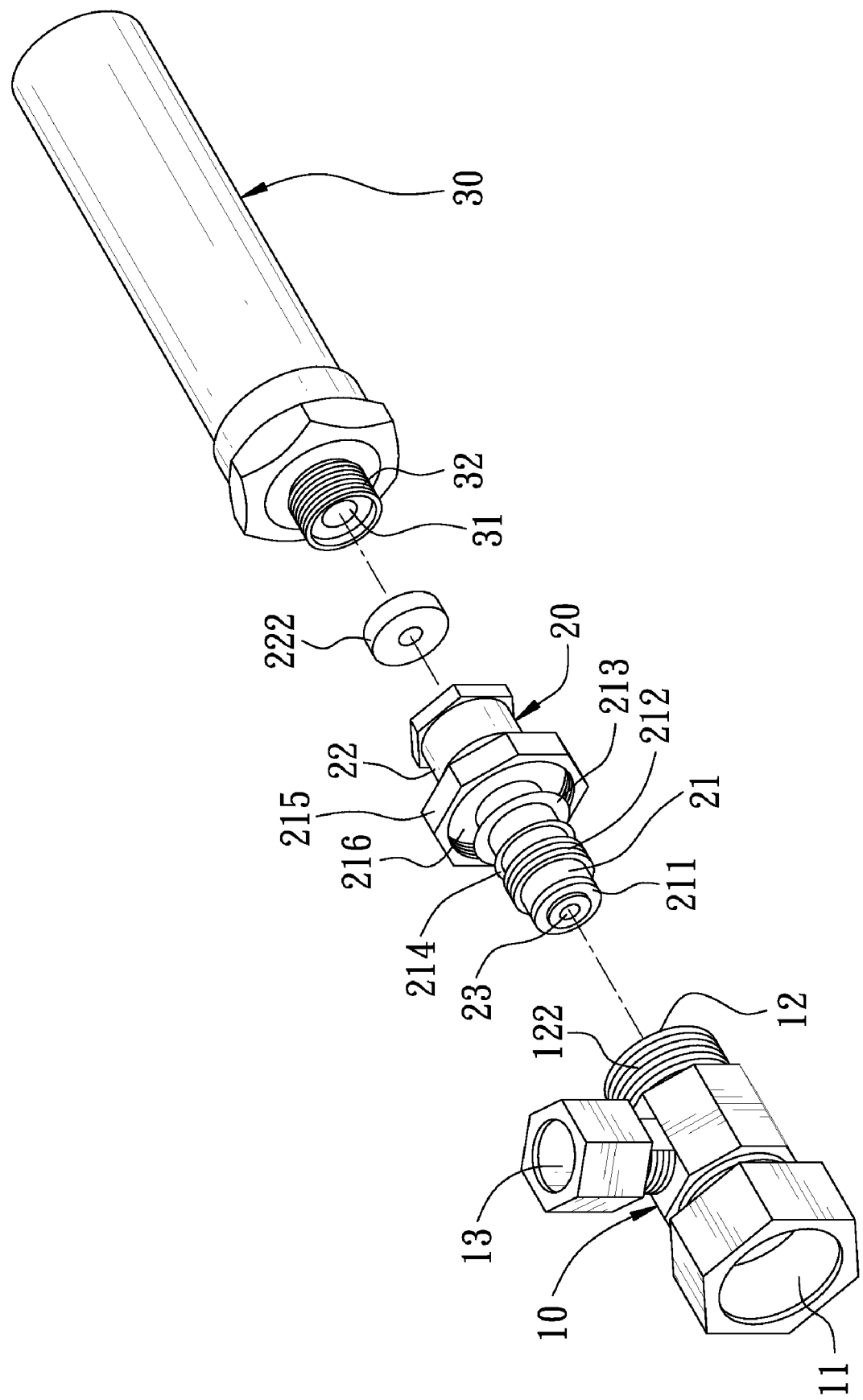
FIG. 3 is an exploded view of the preferred embodiment of this invention.
Figure 4:
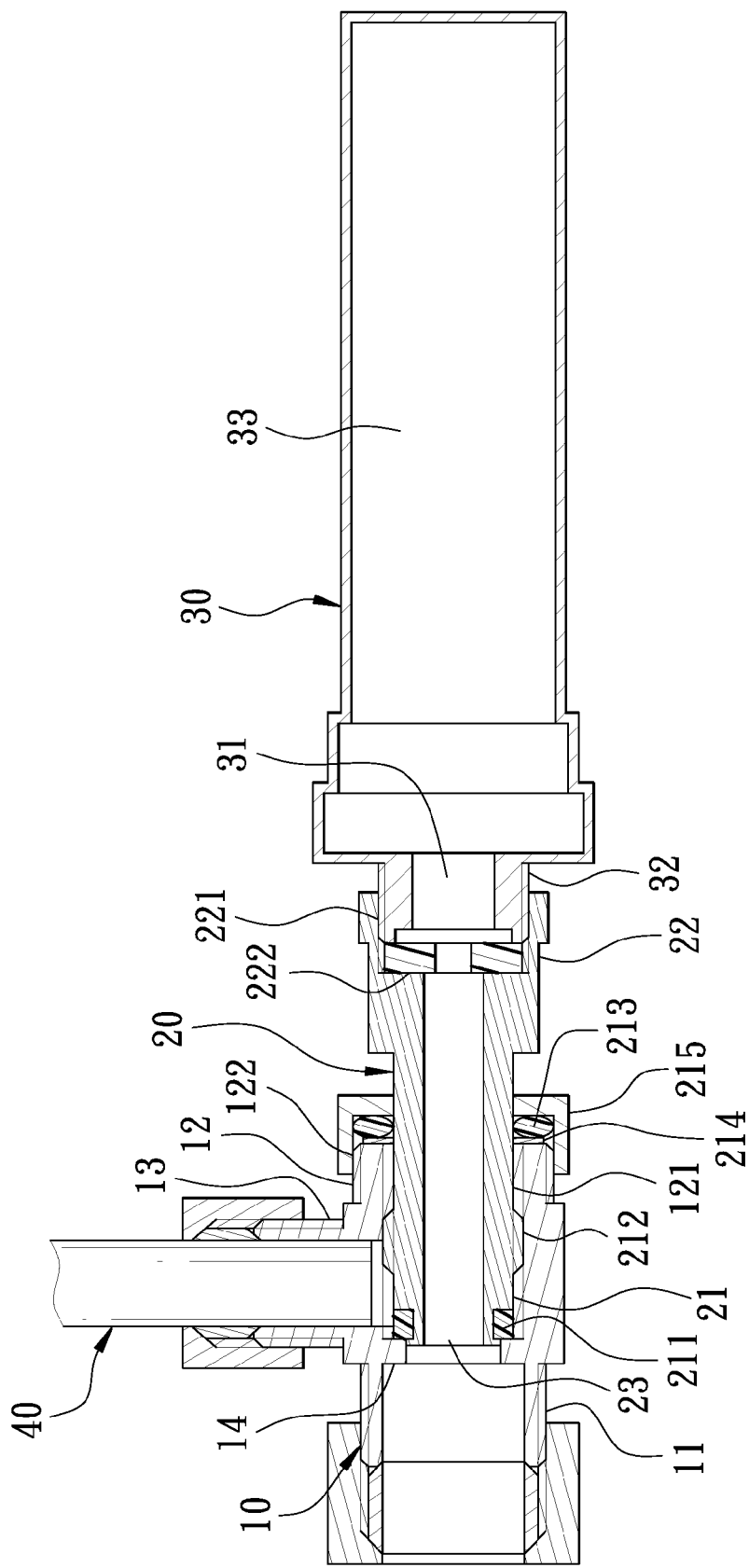
FIG. 4 is a sectional view of the preferred embodiment of this invention.

With reference to FIGS. 3 and 4 respectively as exploded and sectional views of a preferred embodiment of this invention, the valve body 10 is provided with a water inlet 11 conjoint with a water outlet of waterway, the other end of water inlet 11 is provided axially with a joint port 12, the water inlet 11 communicates with the joint port 12, in which an inner thread 121 is formed around the annular surface of joint port 12 and an outer thread 122 is formed around the outer surface, and a water outlet 13 is integrally provided on the joint port 12 and thus conjoint with a water outlet tube 40, and a blocking wall that protrudes is provided around the inner wall of valve body 10 between the water inlet 11 and the joint port 12.

The control valve 20 may valve a switch between the water inlet 11 and water outlet 13 of the valve body 10. One end of the control valve 20 is provided with a first joint 21 and the other end is provided with a second joint 22. A waterway 23 is axially provided passing through between the first joint 21 and the second joint 22. The outer diameter of first joint 21 is less than the inner diameter of joint port 12. A rubber-made water blocking ring 211 is provided stationery around the outer ring of the front end of first joint 21. The first joint 21 is provided around and corresponding to a spirally conjoint section 212 formed over an inner thread 121 that is spirally conjoint with the joint port 12, and thus the control valve 20 may pivot inside the valve body 10. The water blocking ring 211 is used to block the blocking wall 14. A rubber-made leakage stopper ring 213 is provided and put around the fringe of a mouth of the joint port 12 that is corresponding to the outer ring of first joint 21. A washer 214 is set around between the leakage stopper ring 213 and the spirally conjoint section 212. Further, an outer screw nut 215 is provided between the leakage blocking ring 213 and the second joint 22. A blocking surface 216 that protrudes is formed in the outer screw nut 215 corresponding to an inner ring surface of the leakage blocking ring 213; thus, after the first joint 21 is spirally conjoint with the outer thread 122 of joint port 12 by using the outer screw nut 215, the blocking surface 216 is used to limit the leakage blocking ring 213 shifting at the fringe of the joint port 12 so that the leakage blocking ring 213 may closely seal the annular side of joint port to prevent water from being leaking. An inner thread 221 and a rubber-made water blocking ring 222 are provided in the annular surface of second joint 22.

With reference to FIG. 4, the hydraulic pressure damper 30 is provided with a mouth 31 around which externally an outer thread 32 is formed to be spirally conjoint with the inner thread 221 of second joint 22 and exactly against a side of the water blocking ring 222.

In order to further make apparent the structural features, applied skill and manners, and expected effects according to this invention, what are applied in this invention are in detail described, and it is thus believed that this invention is thoroughly and concretely apparent, as described below.

With reference to FIGS. 3 and 4, in order to assemble the hydraulic pressure damping device, firstly the joint port 12 is spirally fixed onto the first joint 21 of the control valve 20, and then the second joint 22 is spirally fixed to the hydraulic pressure damper 30. The water outlet 13 of valve body 10 is conjoint with the water outlet tube 40, and the control valve 20 may be used to valve the switch of water outlet 13 in the valve body 10. The front end of water blocking ring 211 correspondingly blocks the blocking wall 14 and the water outlet 13 above the valve body 10 to easily adjust the quantity of water flowing into the water outlet 13 from the water inlet 11. Besides, despite the water outlet 13 that is open or shut, the hydraulic pressure damper 30 may function.

Figure 5:
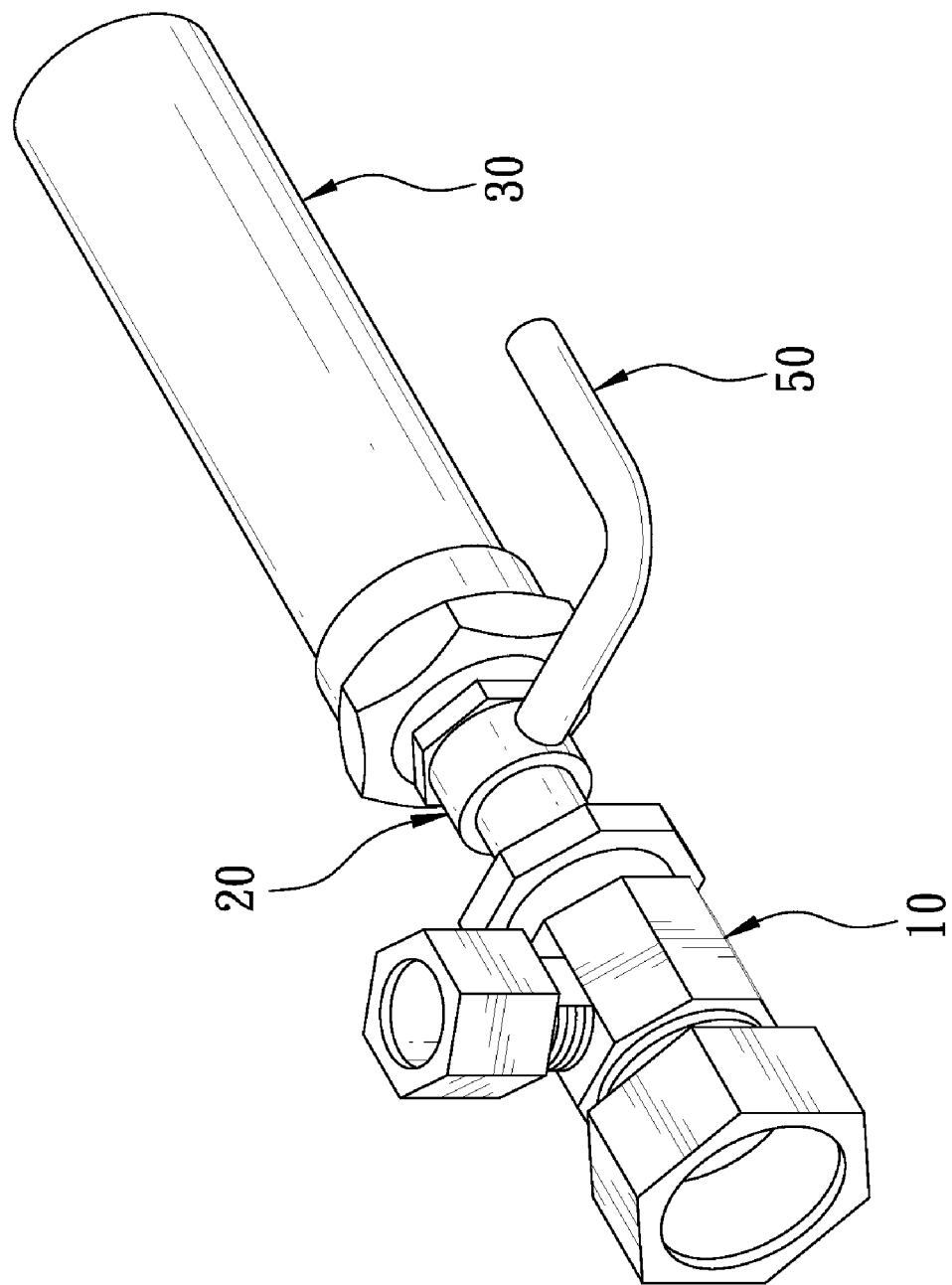
FIG. 5 is a view of the appearance of another preferred embodiment of this invention.

With reference to FIG. 5 as a sectional view of another embodiment of this invention, the structure and function is approximately the same as that in the preferred embodiment of this invention, and what is different is in that a handle knob 50 is provided at a side around the outer ring of control valve 20 between the valve body 10 and the hydraulic pressure damper 30, thereby the control valve 20 being easily turned to control water yield.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A hydraulic pressure damping device, comprising:
   a valve body provided with a water inlet conjoint with a water outlet of pipeline;
   the valve body being separately provided with a joint port that is conjoint with the water inlet and provided with the water outlet;
   a control valve of which one end is provided with a first joint and another end is provided with a second joint;
   a waterway being axially provided passing through the first joint and the second joint, in which the first joint is conjoint with the joint port to valve a switch between the water inlet and the water outlet;
   a hydraulic pressure damper being fixed onto the second joint and communicating with the water inlet through the waterway;
   a blocking wall is formed between the water inlet of valve body and the joint port;
   an inner thread is formed around an annular surface of the joint port;
   a water blocking ring is provided at the front end of first joint; and
   a spirally conjoint section is formed over the first joint to be conjoint with the inner thread of water inlet.

2. The hydraulic pressure damping device according to claim 1, wherein a handle knob is fixed on the control valve.

3. The hydraulic pressure damping device according to claim 1, wherein an inner thread is formed at the second joint and an outer thread is correspondingly formed in the hydraulic pressure damper to be spirally conjoint with the second joint.

4. The hydraulic pressure damping device according to claim 1, wherein an outer thread is formed over the joint port of the valve body;
   the outer diameter of first joint is less than the inner diameter of joint port;
   a leakage blocking ring is put around a fringe of the joint port corresponding to the first joint; and
   an outer screw nut is provided externally around the leakage blocking ring and correspondingly fixed onto the outer thread of joint port.

\* \* \* \* \*